Jan. 28, 1964  E. G. SCHEIBEL  3,119,767
PROCESS FOR THE SOLVENT REFINING OF PETROLEUM
Filed March 11, 1958
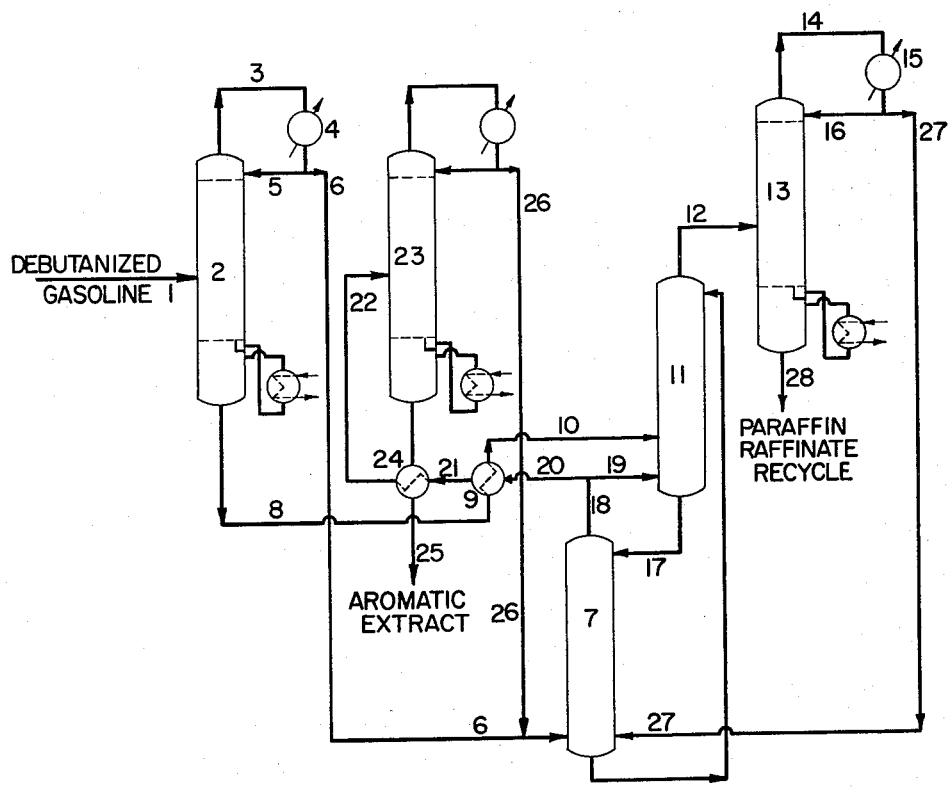
FIG. I
INVENTOR.
EDWARD GEORGE SCHEIBEL
BY:
ATTORNEY

# United States Patent Office 3,119,767
Patented Jan. 28, 1964

3,119,767
PROCESS FOR THE SOLVENT REFINING
OF PETROLEUM
Edward George Scheibel, 75 Harrison Ave.,
Montclair, N.J.
Filed Mar. 11, 1958, Ser. No. 720,785
3 Claims. (Cl. 208—321)

This invention relates to a process for the solvent refining of petroleum. Its object is to provide an economical means for doing so with the use of well known and readily procured solvents and commercially available equipment.

Numerous solvents have been considered for the separation of aromatic and paraffinic constituents in hydrocarbon mixtures. This separation is desirable because the aromatic constituents in a gasoline fraction contribute toward high octane numbers while the straight paraffinic constituents greatly reduce octane numbers. The separation of these latter constituents is extremely desirable because they can be recycled to a catalytic hydroformer and converted to additional aromatic constituents.

Specifically there are different methods for controlling a hydroforming operation. In the case of "high severity" reforming conditions the reactor effluent is very highly aromatic and possesses a high octane number. With "mild severity" reforming conditions the reactor effluent contains an appreciable amount of paraffinic, low-octane constituents. In the first case, catalyst life is considerably shorter than in the latter case and the catalyst life represents a significant factor in the operating costs of a hydroformer. In order to reduce this cost the effluent from a mild severity operation has been subjected to separation processes to obtain an aromatic, high octane number fraction and a paraffinic, low octane number fraction for recycle.

Many solvents have been proposed covering volatilities from the low boiling $SO_2$ to the high boiling glycols. After considering process designs using different solvents, I have found the following to be the requirements for the most economic solvent:

(1) The solvent should be only partially miscible with paraffinic hydrocarbons.

(2) The solvent should have a high solubility for the aromatic constituents in the feed mixture so the ratio of the concentration in the hydrocarbon phase to the concentration in the solvent phase will be as large as possible. Requirement number 1 will place a limit on this second requirement since solvents having a very high solubility for the aromatic hydrocarbons will be completely miscible with paraffinic hydrocarbons.

(3) The solvent should have a low molecular weight.

(4) The solvent should show high selectivity. This is defined as the ratio of the distribution coefficient of the paraffinic hydrocarbon between the two phases to the distribution coefficient of the aromatic hydrocarbon between the two phases.

(5) The solvent should be non-corrosive at the operating conditions of the extraction operation.

(6) The solvent should be stable at the operating condition.

(7) The solvent should be readily recoverable from the hydrocarbon products.

(8) The solvent should be inexpensive.

No solvent meets all these requirements and most of them fail to satisfy two or more of these requirements. However, I have found certain low boiling alcohols meet all these requirements but one. Of these alcohols, I prefer methanol to which a small amount of water has been added to improve its qualification to satisfy the first requirement I have set forth. While this solvent is not as selective as many other solvents now in use, its molecular volume is so small that the saving in solvent volume required decreases the cross sectional area of the extraction column to a greater extent than the increase in height required by the lower selectivity. Thus, there is a net saving in the cost of the extraction column over other solvents.

My process description has been based on the use of a solvent consisting of 5 volumes of water and 95 volumes of methanol, although ethyl alcohol containing a greater concentration of water or isopropyl alcohol containing more water than ethyl alcohol could be used in my process. Methanol is preferred because it is the least expensive.

An important feature of my process is the extraction of the aromatic hydrocarbons from the solvent with a low boiling hydrocarbon which can be readily separated from the aromatic hydrocarbons in the feed. This solvent would be in the butane-pentane-hexane range and in the process description the entire light end fraction of reformate product is used. This contains the benzene and heptane as well as the lower boiling hydrocarbons but the fractionation in the extract stripping column can be very incomplete since the extract product from the bottom of this column contains the exact amount of this fraction in the original feed and only the excess is distilled off and recycled. This process is in contrast to the production of pure aromatics in which a lower boiling hydrocarbon would be used in the solvent stripper. Thus hexane or lower boiling hydrocarbons would be used if the lowest boiling aromatic in the feed to the extractor was toluene and pentane or lower boiling hydrocarbons would be required if the lowest boiling aromatic were benzene. With this modification the process described could be used to prepare a pure aromatic fraction from which the individual components could be readily separated by fractional distillation.

FIGURE 1 is a flow sheet showing one application of the methanol solvent to the refining of reformate to produce a high octane aromatic extract. The debutanized gasoline from the hydroformer is prefractionated to remove the volatile high octane constituents. If the feed contains only small amounts of n-heptane this fraction may cover the $C_5$-220° F. boiling range and if the feed contains appreciable quantities of n-heptane which has zero octane number the volatile fraction will cover only the $C_5$-185° F. range which will include the benzene present in the feed.

The feed is introduced through line 1 to prefractionator 2. The overhead product from the prefractionator passes through line 3, condenser 4, and line 6, to solvent stripper 7 with the recycle light solvent as later described. The bottoms product is cooled and run, by way of line 8, heat exchanger 9, and line 10, to fractional liquid extractor 11, where it is subjected to countercurrent flow of the methanol and the light hydrocarbon. The light phase leaving the top of extractor 11 runs through line 12 to raffinate stripper 13 where the light solvent is distilled off via line 14, condenser 15 and line 16, and the raffinate consisting of the paraffinic components in the original reformate is withdrawn through line 28 from the bottom of the column and recycled to the reformer.

The solvent extract from the bottom of fractional liquid extractor 11 runs via line 17 to solvent stripper 7 where the aromatic hydrocarbons are removed by countercurrent contacting with light hydrocarbon. Part of the light phase is run by lines 18 and 19, to fractional liquid extractor 11, and the balance is run through lines 18, 20, 21 and 22 and heat exchangers 9 and 24 to extract stripper 23, where the light hydrocarbon is distilled off and the aromatic extract is withdrawn through 25 from the bottom of the column with the same amount of light hydrocarbon as originally taken overhead in the prefractionator. This stripper therefore provides only a "sloppy" separation and thus utilizes a lower reflux ratio and less plates than the sharp separation required in the prefractionator. The light hydrocarbon distillate from the extract stripper leaving through line 26, combines with the overhead from the prefractionator in line 6 and the light hydrocarbon distillate leaving via line 27 from the raffinate stripper to provide the light phase feed to solvent stripper 7.

The complete removal of solvent from the light hydrocarbon streams is effected in the strippers because the dissolved methanol and the trace of dissolved water form an azeotrope with the light hydrocarbon and are taken overhead. The complete removal of solvent from the hydrocarbon streams constitutes a difficult and expensive operation when a high boiling solvent is used for the solvent refining of reformate. This removal is particularly essential in the raffinate because of the contamination of the catalyst by the recycle stream. Also in the aromatic extract it may contribute undesirable properties to the final gasoline as well as constituting a loss of solvent. In this case, the methanol in the aromatic stream would not be particularly objectionable, but the tendency would be for substantially all of it to pass overhead in the extract stripper.

Modifications may be made in the process as described in FIGURE 1, and by giving such description it is not intended to limit the scope of this invention.

What I claim is:

1. A process for the separation of aromatic and paraffinic constituents of a petroleum fraction which comprises (1) introducing the petroleum fraction to an intermediate point of a solvent extraction operation through which two immiscible phases are passed countercurrently, one phase consisting of a mixture of water and methanol and the other phase consisting of a low boiling hydrocarbon; (2) contacting the methanol extract phase countercurrently in a solvent stripper with a large volume of the low boiling hydrocarbon phase to remove the aromatic constituent dissolved therein; (3) recycling the stripped methanol from the solvent stripper to the step (1) extraction operation; (4) passing the requisite amount of light phase from the solvent stripper to the step (1) extraction operation and the balance to a distillation column, recovering the light hydrocarbon and recycling to the solvent stripper, and removing the aromatic extract from the distillation column as separated product.

2. A process for the separation of aromatic and paraffinic constituents of a petroleum fraction which comprises (1) introducing the petroleum fraction to an intermediate point of a solvent extraction operation through which two immiscible phases are passed countercurrently, one phase consisting of a mixture of water and methanol and the other phase consisting of a low boiling hydrocarbon; (2) contacting the methanol extract phase countercurrently in a solvent stripper with a large volume of the low boiling hydrocarbon phase to remove the aromatic constituent dissolved therein; (3) recycling the stripped methanol from the solvent stripper to the step (1) extraction operation; (4) passing the requisite amount of light phase from the solvent stripper to the step (1) extraction operation and the balance to a distillation column, recovering the light hydrocarbon and recycling to the solvent stripper, and removing the aromatic extract from the distillation column as a separated product; and (5) passing the raffinate from the step (1) extraction operation to a distillation column, recovering the light hydrocarbon and recycling to the solvent stripper, and removing a paraffinic extract from the distillation column as a separated product.

3. The process of claim 2 wherein the incoming feed is preliminarily fractionated to take off therefrom low boiling hydrocarbon constituents and wherein the low boiling constituents so removed are added to the low boiling hydrocarbon employed in the solvent stripper.

References Cited in the file of this patent
UNITED STATES PATENTS

| | | |
|---|---|---|
| 2,727,848 | Georgian | Dec. 20, 1955 |
| 2,799,627 | Haensel | July 16, 1957 |

FOREIGN PATENTS

| | | |
|---|---|---|
| 1,068,677 | France | June 30, 1954 |